United States Patent

Freriks et al.

[11] Patent Number: 5,811,198
[45] Date of Patent: Sep. 22, 1998

[54] ACID FUNCTIONAL AND EPOXY FUNCTIONAL POLYESTER RESINS

[75] Inventors: Jan Freriks; Petrus Gerardus Kooijmans; Gerrit Gerardus Rosenbrand, all of CM Amsterdam, Netherlands; Marianne Angele Walravens, Ottignies Louvain-la-Neuve, Belgium

[73] Assignee: Shell Oil Company, Houston, Tex.

[21] Appl. No.: 958,348

[22] Filed: Oct. 27, 1997

Related U.S. Application Data

[62] Division of Ser. No. 582,855, Jan. 4, 1996, Pat. No. 5,739, 213.

[30] Foreign Application Priority Data

Jan. 6, 1995 [EP] European Pat. Off. ............. 95200022

[51] Int. Cl.$^6$ ............. B32B 27/06; C08G 63/16
[52] U.S. Cl. ............. 428/482; 528/302; 528/307; 528/308; 525/437; 525/444; 525/450; 524/81; 428/480
[58] Field of Search ............. 528/302, 307, 528/308; 525/437, 444, 445, 450; 524/81; 428/480, 482

[56] References Cited

U.S. PATENT DOCUMENTS

| | | | |
|---|---|---|---|
| 3,404,018 | 10/1968 | Hicks | 106/252 |
| 3,491,066 | 1/1970 | Petropoulos | 260/75 |
| 3,651,098 | 3/1972 | Heer et al. | 260/248 A |
| 3,749,758 | 7/1973 | Gannon | 260/835 |
| 4,097,466 | 6/1978 | Berger | 260/75 EP |
| 4,997,907 | 3/1991 | Marten et al. | 528/272 |
| 5,138,078 | 8/1992 | Brytus | 549/557 |
| 5,212,213 | 5/1993 | Hutter | 522/81 |
| 5,480,960 | 1/1996 | Freriks et al. | 528/198 |
| 5,484,842 | 1/1996 | Lewarchik et al. | 524/608 |
| 5,576,397 | 11/1996 | Oberressl et al. | 525/444 |

Primary Examiner—Samuel A. Acquah

[57] ABSTRACT

Linear, tertiary carboxyl functional polyester resins suitable for the production of coatings having excellent outdoor durable properties, the polyester resins obtainable by reaction of a) at least one aromatic and/or cycloaliphatic carboxylic acid compound A comprising two aromatic- and/or secondary aliphatic carboxyl groups or the anhydride thereof, b) at least one hydroxyl compound B comprising two aliphatic hydroxyl groups, which groups each independently may be primary or secondary hydroxyl groups, c) at least one hydroxyl substituted carboxylic acid compound C comprising at least one tertiary aliphatic carboxyl group and two aliphatic hydroxyl groups, which groups each independently may be primary or secondary hydroxyl groups, and d) optionally one carboxylic acid compound D comprising one carboxyl group, the molar ratio of compounds A:B:C:D being (X+Y−1):X:Y:Z,
wherein X ranges from 2 to 8, Y ranges from 2 to 8, and Z ranges from 0 to 2.

These polyester resins may be used together with a suitable curing agent for the production of powder coatings, or may be converted into the corresponding glycidylesters, which in combination with a suitable curing agent can be used for the production of powder coatings.

19 Claims, 1 Drawing Sheet

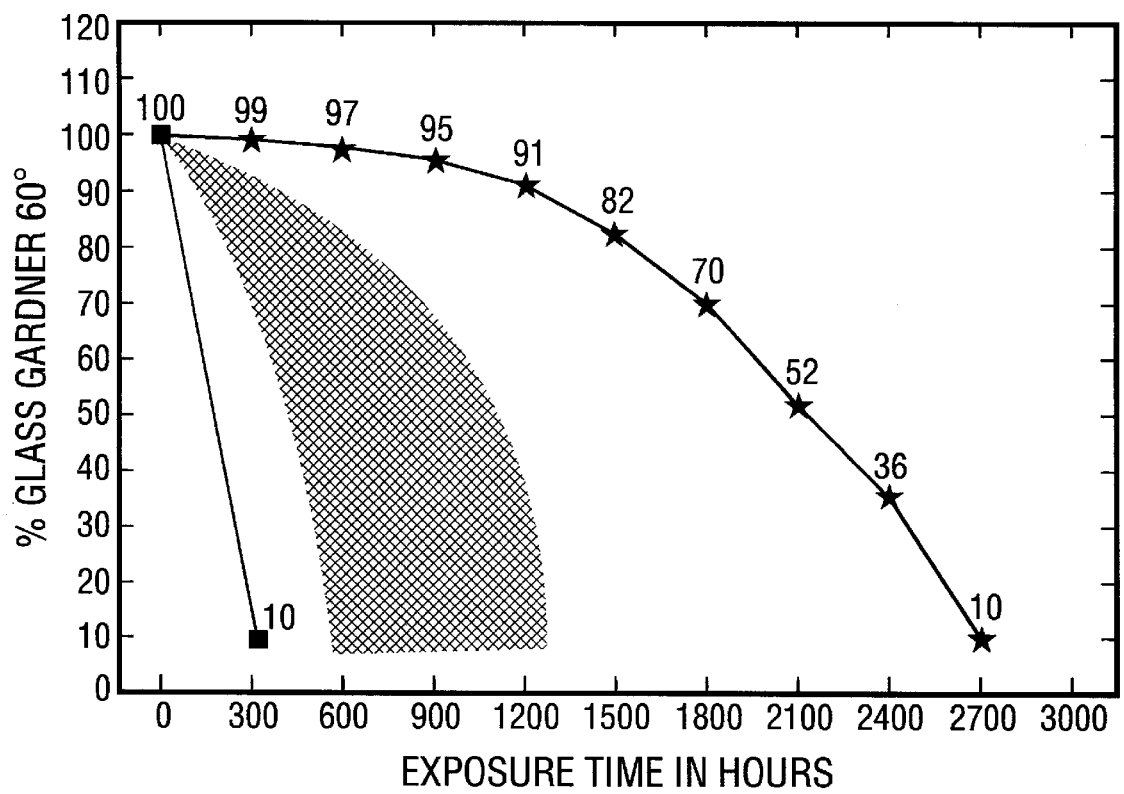

ACID FUNCTIONAL AND EPOXY FUNCTIONAL POLYESTER RESINS

This is a division of application Ser. No. 08/582,855, filed Jan. 4, 1996 now U.S. Pat. No. 5,739,213.

BACKGROUND OF THE INVENTION

The present invention relates to linear, tertiary carboxyl functional polyester resins, to a process for the preparation of the resins, to polyglycidylester resins obtainable by glycidating said linear, tertiary carboxyl functional polyester resins, to coating compositions, especially powder coating compositions, comprising said linear, tertiary carboxyl functional polyester resins or said polyglycidylester resins and to cured products obtained by using the indicated coating compositions.

Powder coating compositions based on the solid reaction products of 2,2-bis-(4-hydroxyphenyl)propane and epichlorohydrin are known. The cured products prepared from these compositions are resistant against hydrolysis. However, they only show a low ultraviolet resistance and are therefore not suitable for applications requiring a high outdoor durability such as building parts or automotive topcoats.

Triglycidylesters which can be used in good quality outdoor durable coatings and in molding compositions are disclosed in U.S. Pat. No. 5,138,078. Due to the secondary nature of the terminal carboxyl functions present in the tricarboxylic acid adduct precursors, strong alkaline conditions should be avoided during glycidation of these tricarboxylic acid adducts to avoid hydrolysis of the glycidyl ester formed and/or hydrolysis of one or more ester groups in the resin backbone. As a result thereof the triglycidylester produced will contain a relatively high level of hydrolyzable chlorine and/or will contain low molecular weight hydrolysis products.

The high level of hydrolyzable chlorine is reflected in example 2 of U.S. Pat. No. 5,138,078 which relates to the glycidation of the 2:1 adduct of hexahydrophthalic anhydride and dimethylolpropionic acid. The product obtained has a chlorine content of 1.5%. Such a high level of residual chlorine is generally undesirable in coating compositions. In addition, due to the fact that the triglycidylesters reported in U.S. Pat. No. 5,138,078 are liquid, they can not be applied in powder coating compositions.

The most commonly used system for outdoor durable powder coatings are polyester/triglycidylisocyanurate (TGIC). For health and safety reasons however the use of TGIC is not desirable. TGIC is relatively toxic (Rat Oral $LD_{50}$ of 0.4 g/kg) and there are indications that the compound is mutagenic according to the Ames Mutagenicity Test.

Therefore, there is a need for resin systems which are particularly suitable for use in powder coating composition, which are relatively non toxic as compared to the current polyester/TGIC systems and show excellent outdoor durability in the cured state.

Therefore, it is an object of the invention to provide linear, acid functional polyester resins in which the add-functionality only comprises tertiary aliphatic carboxylic acid functionality, which can be readily glycidated so as to form a polyglycidylester resin.

SUMMARY OF THE INVENTION

Accordingly, a linear tertiary aliphatic carboxyl functional polyester resin is provided, comprising a product produced by reacting a) at least one aromatic and/or cycloaliphatic carboxylic acid compound A comprising two aromatic- and/or secondary aliphatic carboxyl groups or the anhydride thereof, b) at least one hydroxyl compound B comprising two aliphatic hydroxyl groups, c) at least one hydroxyl substituted carboxylic acid compound C comprising at least one tertiary aliphatic carboxyl group and two aliphatic hydroxyl groups, and d) optionally one carboxylic acid compound D comprising one carboxyl group, the molar ratio of compounds A:B:C:D being (X+Y−1):X:Y:Z, wherein X ranges from 2 to 8, Y ranges from 2 to 8, and Z ranges from 0 to 2.

The linear, tertiary carboxyl functional polyester resin and the polyglycidylester resin prepared by glycidation thereof are particularly suitable for use in outdoor durable powder coating compositions which are relatively environmentally friendly.

BRIEF DESCRIPTION OF THE DRAWINGS

FIG. 1 is a plot of percent gloss gardner 60° vs. exposure times in hours of the powder coating formulations of Example 4.

DETAILED DESCRIPTION OF THE INVENTION

The backbone of the resins according to the present invention do not comprise any ester functions which are susceptible to hydrolysis, and the polyester resins do not comprise any functionalities which are UV-sensitive. The end groups of the linear not comprise any functionalities which are UV-sensitive. The end groups of the linear resins according to the present invention are hydroxyl groups or, optionally, esterified hydroxyl groups.

Accordingly, the invention provides a linear, tertiary carboxyl functional polyester resin obtainable by reaction of a) at least one aromatic and/or cycloaliphatic carboxylic acid compound A comprising two aromatic- and/or secondary aliphatic carboxyl groups or the anhydride thereof, b) at least one hydroxyl compound B comprising two aliphatic hydroxyl groups, which groups each independently may be primary or secondary hydroxyl groups, c) at least one hydroxyl substituted carboxylic acid compound C comprising at least one tertiary aliphatic carboxyl group and two aliphatic hydroxyl groups, which groups each independently may be primary or secondary hydroxyl groups, and d) optionally one carboxylic acid compound D comprising one carboxyl group, the molar ratio of compounds A:B:C:D being (X+Y−1):X:Y:Z, wherein X ranges from 2 to 8, Y ranges from 2 to 8, and Z ranges from 0 to 2.

The process which may be used to prepare the polyester resins according to the present invention is preferably carried out until all, or essentially all, the non-tertiary carboxyl groups as initially present in the reaction mixture have reacted. It will be appreciated that instead of the pure (or almost pure) compounds A, B, C and D, also mixtures of two or more compounds A, B, C and respectively D may be used.

The linear, tertiary carboxyl functional polyester resins thus produced are essentially free from non tertiary carboxyl groups when they have an acid value which practically corresponds to the theoretical acid value calculated on the basis of the amount of tertiary carboxyl groups of the reactants as initially present in the reaction mixture. The term practically is used herein to indicate a deviation from the theoretical value of +/−8%, preferably 5%, more preferably 3%, at most. This is determined by standard alkalimetric titration.

For those skilled in the art it will be understood that the molecular weight distribution and number average molecular weight of the resin produced will depend on the specific reactants and the ratios applied in the process of the invention. Whilst the tertiary aliphatic carboxyl groups present in compound C practically do not react under the esterification conditions employed, glycidation of these tertiary aliphatic carboxyl groups with epihalohydrin can be performed under standard alkaline conditions whereby a polyglycidylester resin can be obtained which contains a low hydrolyzable halogen content, usually lower than 0.5% by weight based on the total weight of the composition. Further, as during glycidation hardly any hydrolysis of the resin backbone occurs and thus no low molecular weight products are formed, the polyester resins of the present invention are particularly suitable for the preparation of powder coatings, in view of the absence of relatively low molecular weight products.

It will be understood that in the esterification reaction the reactivity of primary hydroxyl groups is higher than the reactivity of secondary hydroxyl groups, which in their turn are more reactive than tertiary hydroxyl groups. The same order of reactivity helds for carboxyl groups. Acid anhydrides are more reactive than the corresponding (di)acids. Further, substituents at the beta-position of hydroxyl or carboxyl group will usually influence the reactivity, and usually will result in a lower reactivity. On the basis of the reactivity orders it will be possible to predict the most likely chemical structures within the molecular weight distributions of the resins based on compounds A, B, C and optionally D. It is observed that in one of the more preferred embodiments of the invention, in which compound A is hexahydrophthalic acid anhydride, compound B is hydrogenated diphenylolpropane and compound C is dimethylolpropionic acid, due to the higher reactivity of compound B when compared with compound C, the smallest molecule formed during esterification containing a tertiary carboxyl group will be a resin molecule made from 1 molecule C, 2 molecules A and 2 molecules B, having a molecular weight of about 900. This means that after glycidation even the smallest molecule possible has a relatively high molecular weight, and thus a low toxicity of the product is expected.

As the invention relates to linear polyester resins, compounds A, B and C should be bi-functional with respect to the groups participating in the formation of the ester functions present in the resin backbone. Thus, the amount of mono- or poly-functional impurities in the compounds A, B and C will generally be less than 15%, preferably less than 7%, more preferably less than 3%. In the case of severe esterification conditions some esterification may occur on tertiary carboxylic groups, resulting in branched resins. This usually concerns less than 3% of the tertiary carboxylic groups present in the reaction mixture, and under the more preferred esterification condition the amount will be less than 1%.

The process which may be used to prepare the polyester resins of the present invention may be carried out according to conventional esterification methods, preferably by azeotropic condensation. In particular, the condensation is carried out by charging compounds A to C, and optionally compound D, to the reactor followed by reaction at a temperature within the range of about 120° to about 230° C., preferably about 180° to about 220° C., and the reaction is continued until the non-tertiary carboxyl groups as initially present in the reaction mixture have disappeared. In an alternative procedure, the condensation is carried out by charging compounds A and C to the reactor, followed by reaction between about 100° and about 220°°C., whereafter compound B and optionally compound D is added to the reaction mixture, followed by reaction at a temperature within the range of about 120° to about 230° C. Following this procedure it is made sure that compound C will not be an end group or part of the end group in the ultimate polyester resin.

Generally the azeotropic removal of water is being continued until a reaction product is obtained which has an acid value which corresponds to the theoretical acid value as referred to above. In general, the use of one or more esterification catalysts, such as dibutyltinoxide, paratoluenesulfonic acid, tinoctoate, zincoctoate and lithiumricinoleate is not required, and preferably no catalyst is used. However, if desired, esterification catalysts may be used.

The polyester resins of the present invention are suitably derived from compounds A selected from aromatic and, in particular, from cycloaliphatic dicarboxylic acids comprising two secondary aliphatic carboxyl groups or the anhydride thereof. Compounds A are for example phthalic acid (PA), tetrahydrophthalic acid, hexahydrophthalic acid (HHPA), methylhexahydrophthalic acid, terephthalic acid, isophthalic acid, decahydronaphthalene dicarboxylic acid, endomethylenetetrahydrophthalic acid, methylendomethylenetetrahydrophthalic acid, 1,4-cyclohexanedicarboxylic acid and 1,3-cyclohexanedicarboxylic acid or the anhydrides thereof, or combinations thereof; HHPA, especially the anhydride being particularly preferred.

The polyester resins of the present invention are suitably derived from compounds B comprising two secondary aliphatic hydroxyl groups. Preferably compound B comprises one or more cyclohexane groups, the compound being substituted by two secondary hydroxyl groups.

Suitable compounds B for use in the process of the present invention include branched aliphatic-, cycloaliphatic-, or araliphatic compounds, containing two aliphatic hydroxyl groups, each individually being either a primary or a secondary hydroxyl group, such as for example propylene glycol, neopentylglycol, hydrogenated diphenylolpropane (HDPP), hydrogenated diphenylolmethane, hydrogenated 4,4'-dihydroxydiphenyl, 1,4-cyclohexanedimethylol, 1,2-, 1,3- or 1 ,4-dihydroxycyclohexane, hydroxypivalylhydroxypivalate and 2-butyl-2-ethyl-1,3-propanediol or mixtures thereof; HDPP being particularly preferred.

The polyester resins of the present invention are suitably derived from compounds C selected from compounds comprising atertiary aliphatic carboxyl group and two primary hydroxyl groups. A preferred compound C is dimethylolpropionic acid.

The polyester resins of the present invention are suitably derived from compounds D comprising only one carboxylic acid group. Compound D is especially an aliphatic, cycloaliphatic or aromatic acid, more especially a secondary acid. Preferably compound D is an aromatic or cycloaliphatic acid, more preferably a secondary cycloaliphatic acid. A preferred compound D is a cycloalkyl carboxylic acid, especially a $C_5$–$C_8$ cycloalkylcarboxylic acid, more preferably cyclohexyl carboxylic acid.

Compounds A, B, C and D may or may not be substituted. The substituents, for instance alkyl, especially $C_{1-4}$ alkyl, and hydroxy, should not deteriorate the outdoor durability of the cured product. Preferably the compounds are not substituted, or substituted by one or more alkyl groups.

It was found that in the linear, tertiary carboxyl functional polyester resins according to the invention X preferably ranges from 5 to 7, more preferably is 6, and Y preferably ranges from 3 to 5, more preferably is 4. It is observed that small deviations in the amounts of compound A (X+Y−1) are allowable. Usually the deviations should be less than 5 percent, preferably less than 3%, more preferably less than 1%. In general a small under measure of compound A is preferred over an excess. In the case that it appears that there is an undesired excess of compound A, additional amounts of compounds B and C may be added to the reaction mixture. Z may range from 0–2, preferably from 1–2, more preferably is 2, provided that compound D is used.

The present invention also relates to a process for the preparation of linear, tertiary carboxyl functional polyester resins as defined hereinbefore by reaction of a) at least one aromatic and/or cycloaliphatic carboxylic acid compound A comprising two aromatic- and/or secondary aliphatic carboxyl groups or the anhydride thereof, b) at least one hydroxyl compound B comprising two aliphatic hydroxyl groups, which groups each independently may be primary or secondary hydroxyl groups, c) at least one hydroxyl substituted carboxylic acid compound C comprising at least one tertiary aliphatic carboxyl group and two aliphatic hydroxyl groups, which groups each independently may be primary or secondary hydroxyl groups, and d) optionally one carboxylic acid compound D comprising one carboxyl group, the molar ratio of compounds A:B:C:D being (X+Y−1):X:Y:Z, wherein X ranges from 2 to 8, Y ranges from 2 to 8, and Z ranges from 0 to 2.

The process is preferably carried out at a temperature within the range of about 100° to about 230° C., preferably about 180° to about 220° C., until essentially all the non-tertiary carboxyl groups as initially present in the reaction mixture have reacted. The reaction time is less than about 8 hours, often less than about 4 hours.

As indicated above the linear, tertiary carboxyl functional polyester resin according to present invention can be easily converted to a polyglycidylester resin according to methods known in the art i.e. by reaction with an excess epihalohydrin in the presence of a suitable base and, optionally, a catalyst. Most conveniently epichlorohydrin is being used.

The linear, tertiary carboxyl functional polyester resin and the polyglyddylester resin of the invention are both suitable for use in powder coating compositions, which in the cured state show good outdoor durability. Moreover in view of the polymeric nature of the polyglycidylester resin of the invention a lower level of toxicity as compared to TGIC is foreseen and therefore they can advantageously be used as an alternative to TGIC in powder coatings.

The curable powder coating compositions of the invention may be prepared by addition of a cross-linking resin to either the linear, tertiary carboxyl functional polyester resin obtainable by the process of the present invention or to the polyglycidylester resin obtainable by glycidating said linear, tertiary carboxyl functional polyester resin. The amount of cross-linking compound used in the powder coating compositions of the invention will normally be such so as to provide about equal amounts of reactive groups of the cross-linking compound and of the tertiary carboxyl groups present in the linear, tertiary carboxyl functional polyester resin or of the epoxy groups present in the polyglycidylester resin.

Suitable cross-linking resins for use in combination with the linear, tertiary carboxyl functional polyester resins of the present invention are for example outdoor durable epoxy resins, such as for example the diglycidylester of terephthalic acid, the polyglycidylester resins according to the present invention, the diglycidylesters of alpha, alpha-dibranched dicarboxylic acids as disclosed in European Patent Application publication number 518,408 and the polyglycidylesters based on polycarboxylic acids carrying two alkyl substituents on each of the alpha carbon atoms as disclosed in European patent application publication number 366,205.

Suitable cross-linking resins for use in combination with the polyglycidylester resins of the present invention are for example the (corresponding) acid functional polyester resin of the present invention; solid polyacids such a sebacic acid, adipic acid, 1,12-dodecanedioic acid; anhydrides such as polyazeleic polyanhydride and trimellitic anhydride; acid functional polyesters such as the reaction product of one mole of trimethylopropane and 3 moles of hexahydrophthalic anhydride, the reaction product of 1,6-hexanediol with a molar excess of 1,12-dodecanedioic acid, the reaction product of 4 mols 1,10-decanedicarboxylic acid, 1.49 mols hexanediol, 0.47 mols 1,1,1-tris-(hydroxymethyl)-propane and 0.27 mols pentaerythritol, the reaction product of 4 mols 1,10-decanedicarboxylic acid, 1.2 mols hexanediol, 0.45 mols trimethylol-propane, 0.29 mols pentaerythritol and 0.21 mols dimethylolpropionic acid and the reaction product of one mole of hexamethoxymethylmelamine and 3 moles of hydroxypivalic acid; cyanuric acid; and solid basic curing agents such as dicyandiamide and $BF_3$-complexes.

The powder coating compositions of the present invention may further comprise a catalyst and optionally other additives, as known in the art to be suitable for use in powder coating compositions.

Suitable catalyst are for example quaternary ammonium and phosphonium salts; metal salts/compounds such as for example stannous(II)octoate; basic compounds such as for example the imidazoles; and tertiary amines such as for example 1,8-diazabicycloundecene.

The amount of catalyst used will usually somewhere in the range of from 0.1 to 2% by weight based on the weight of the total powder coating composition.

Suitable cure times and cure temperatures of the powder coating compositions of the invention are those conventionally applied in connection with powder coating systems.

The invention is illustrated by the following nonlimiting examples.

EXAMPLE 1

Hexahydrophthalic acid anhydride (9 moles), hydrogenated diphenylolpropane (6 moles) and dimethylolpropionic acid (4 moles) were charged to a round bottom glass reactor, equipped with temperature control, nitrogen inlet, stirrer and distillation device. The mixture was heated to 150° C. in 30 minutes. The temperature of the reaction mixture was increased in one hour to 180° C. and kept at 180° C. for another hour. A vacuum of 950 mbar was applied and the temperature of the mixture was increased to 200° C. and kept at 200° C. until the theoretical acid value was reached. The acid functional polyester thus formed was discharged and allowed to cool down to room temperature.

EXAMPLE 2

Hexahydrophthalic acid anhydride (9 moles) and dimethylolpropionic (acid (4 moles) were charged to a round bottom glass reactor, and heated to 150° C. and kept at this temperature until the reaction was completed (which takes about 1–2 hours). At this stage hydrogenated diphenylolpropane (6 moles) was charged to the reaction mixture and the temperature was increased to 180° C. for another hour, whereafter the reaction was continued in the same way as Example 1.

| Characteristics of the product: | Acid Value | 1180 mmol/kg |
|---|---|---|
| | OH Value | 590 mmol/kg |
| | Melting point (Koffler) | 105–125° C. |

EXAMPLE 3

An amount equalling 1 carboxyl group equivalent of a linear tertiary aliphatic polyester resin as prepared in Example 1 was dissolved in 10 moles epichlorohydrin and 560 ml of isopropylalcohol. The solution was charged to a 3 liter glass-reactor equipped with a temperature control, stirrer and reflux condenser. The temperature was raised to 80° C., followed by the gradual addition of an aqueous solution of 1.1 moles NaOH over a period of 170 minutes. After an additional reaction period of 15 minutes the reactor content was allowed to settle and the aqueous phase was separated from the organic phase. The organic phase was vacuum flashed. The resulting product was dissolved in methylisobutylketone and the organic phase was washed three times with water where after the organic phase was vacuum flashed. The glycidylester thus obtained was discharged and allowed to cool down.

| Characteristics: | Epoxy Group Content | 985 mmol/kg |
|---|---|---|
| | OH Value | 553 mmol/kg |
| | Hydrolyzable Chlorine | <0.45% wt |
| | Melting point (Koffler) | 78–98° C. |

EXAMPLE 4

Powder coating formulation:

| Ingredients | Weights in g |
|---|---|
| Glycidyl ester as prepared in Example 3 | 579.6 |
| Carboxylic acid group containing semi-crystalline polyester[1] | 216.1 |
| Titanium dioxide | 159.1 |
| Modaflow III[2] | 9.7 |
| Benzoin | 6.3 |
| Actiron SNO 30[3] | 29.2 |

[1]Carboxylic functional semi-crystalline polyester prepared as described below.
[2]Modaflow III is an acrylic-based flow aid available from Monsanto Co.
[3]Actiron SNO 30 is a solid catalyst available from Protex.

The powder was prepared according to the following procedure.

The ingredients were mixed at room temperature, then melt-blended in a Buss single screw extruder at 110° C. The extrudate was chilled, flaked, ground in a micromill and classified through a 106 micrometer mesh.

The powder was electrostatically sprayed onto chromate-pretreated, 2 mm thick aluminium panels. The coated panels were baked at 200° C. for 15 minutes. The resultant coatings (thickness 40–60 micrometers) were very smooth, hard, glossy and exhibited good mechanical and chemical properties as well as good weathering resistance (less than 10% reduction in gloss after exposure for 1200 hours in a Xenon type weather-O-meter running the SAE 1960 test method. A comparison with a resin based on (EPIKOTE, straight line) and a number of commercial polyesters/acrylics resins (shaded area) is given in FIG. 1 (% gloss gardner 60° vs. exposure time in hours).

The carboxylic acid group containing semi-crystalline polyester as mentioned above was prepared as follows. 4.0 moles of 1,10-decanedicarboxylic acid, 3.0 moles of 3.0 moles of 1,6-hexanediol and xylene (5% on intake) were charged into a glass reaction flask equipped with anchor stirrer, thermometer, Dean-Stark water trap and nitrogen inlet. The esterification reaction started at 170° C. and the reaction water formed was removed by azeotropic distillation. The temperature of the reaction mixture was raised to, and held at 220° C. until essentially all the hydroxyl functions had reacted. The mixture was cooled to about 180° C. and a vacuum (200 mmbar) was applied to removed the azeotropic solvent (xylene). Finally, vacuum was removed, the polyester was cooled to about 160° C., discharged into an aluminium tray and allowed to cool to room temperature.

EXAMPLE 5

Hexahydrophthalic anhydride (9 moles), hydrogenated diphenylolpropane (6 moles), dimethylolpropionic acid (4 moles) and cyclohexane carboxylic acid (2 moles) were charged to a round bottom glass reactor, equipped with temperature control, nitrogen inlet, stirrer and distillation device. The mixture was then heated to 150° C. in 30 minutes. The temperature of the reaction mixture was increased in one hour to 180° C. and kept at 180° C. for another hour. A vacuum of 950 mbar was applied and the temperature of the mixture was increased to 200° C. and kept at 200° C. until the theoretical acid value as referred to above was reached. The acid functional polyester thus formed was discharged and allowed to cool down to room temperature.

EXAMPLE 6

Hexahydrophthalic anhydride (9 moles) and dimethylolpropionic acid (4 moles) were charged to a round bottom glass reactor, heated to 150° C. and kept at this temperature until the anhydride/hydroxyl reaction was completed (1–2 hours). At this stage hydrogenated diphenylolpropane (6 moles) and cyclohexane carboxylic acid (2 moles) were charged to the reaction mixture and the preparation was continued according to Example 5.

EXAMPLE 7

Hydrogenated diphenylolpropane (6 moles) and cyclohexane carboxylic acid (2 moles) were charged to a round bottom glass reactor, heated to 180° C. and kept at this temperature until the acid/hydroxyl reaction was completed (1–2 hours). At this stage hexahydrophthalic anhydride (9 moles) and dimethylpropionic acid (4 moles) were charged to the reaction mixture and the preparation was continued according to Example 5.

EXAMPLE 8

The first stage of Example 6 and the first stage of Example 7 were carried out separately. Both mixtures were poured together at 180° C. and the preparation was continued according to Example 5.
Characteristics:
Acid Value 1170 mmol/kg
Melting point (Koffler)

EXAMPLE 9

An amount equalling 1 carboxyl group equivalent of a linear tertiary aliphatic polyester resin as prepared in Example 6 was dissolved in 10 moles epichlorohydrin (ECH) and isopropylalcohol (IPA). The solution was charged to a 3 liter glass reactor equipped with a temperature control, stirrer and reflux condenser. The temperature was raised to 80° C., followed by the gradual addition of an aqueous solution of 1.1 moles NaOH over a period of 170 minutes. After an additional reaction period of 15 minutes the reactor content was allowed to settle and the aqueous phase was separated from the organic phase.

The organic phase was vacuum flashed to remove water, IPA and ECH. The resulting product was dissolved in methylisobutylketone (MIBK) and the organic phase was washed three times with water whereafter the organic phase was vacuum flashed to remove MIBK. The glycidylester thus obtained was discharged and allowed to cool down.

| Characteristics: | Epoxy Group Content | 850–950 mmol/kg |
| --- | --- | --- |
| | Hydrolyzable Chlorine | 166 mmol/kg |
| | Melting point (Koffler) | |

EXAMPLE 10

A powder coating composition comprising the following ingredients was prepared:

| Ingredients | Weights in g |
| --- | --- |
| Glycidylester according to Example 9 | 579.6 |
| Carboxylic acid group containing functional semi-crystalline polyester[1] | 216.1 |
| Titanium dioxide | 159.1 |
| Modaflow III[2] | 9.7 |
| Benzoin | 6.3 |
| Actiron SNO 30[3] | 29.2 |

[1]Carboxylic functional semi-crystalline polyester based on 1,10-decanedicarboxylic acid (4.0 moles), 1,6-hexanediol (1.49 moles), 1,1,1-tris-(hydroxymethyl)-propane (0.47 moles) and pentaerythritol (0.27 moles).
[2]Modaflow III is an acrylic-based flow aid available from Monsanto Co.
[3]Actiron SNO 30 is a solid catalyst available from Protex.

The powder was prepared according to the following procedure.

The ingredients were mixed at room temperature, then melt-blended on a Buss single screw extruder at 110° C. The extrudate was chilled, flaked, ground in a micromill and classified through a 106 micrometer mesh.

The powder was electrostatically sprayed onto chromate-pretreated, 2 mm thick aluminium panels. The coated panels were baked at 200° C. for 15 minutes. The resultant coatings (thickness 40–60 micrometers) were very smooth, hard, glossy and exhibited good mechanical and chemical properties as well as good weathering resistance (less than 10% reduction in gloss after exposure for 1200 hours in a Xenon type weather-O-meter running the SAE 1960 test method).

We claim:

1. A polyglycidylester resin prepared by reacting a linear, tertiary carboxyl functional polyester resin produced by reacting
   a) at least one aromatic and/or cycloaliphatic carboxylic acid compound A comprising two aromatic- and/or secondary aliphatic carboxyl groups or the anhydride thereof,
   b) at least one hydroxyl compound B comprising two aliphatic hydroxyl groups,
   c) at least one hydroxyl substituted carboxylic acid compound C comprising at least one tertiary aliphatic carboxyl group and two aliphatic hydroxyl groups, and
   d) optionally one carboxylic acid compound D comprising one carboxyl group, the molar ratio of compounds A:B:C:D being (X+Y−1):X:Y:Z, wherein X ranges from 2 to 8, Y ranges from 2 to 8, and Z ranges from 0 to 2, with epihalohydrin in the presence of a base.

2. The polyglycidylester resin of claim 1 wherein the epihalohydrin used is epichlorohydrin.

3. A powder coating composition comprising a polyglycidylester resin of claim 1 and a cross-linking agent.

4. A product coated with the powder coating composition of claim 3.

5. A polyglycidylester resin prepared glycidating a linear, tertiary carboxyl functional polyester resin produced by reacting
   a) at least one aromatic and/or cycloaliphatic carboxylic acid compound A comprising two aromatic- and/or secondary aliphatic carboxyl groups or the anhydride thereof,
   b) at least one hydroxyl compound B comprising two aliphatic hydroxyl groups,
   c) at least one hydroxyl substituted carboxylic acid compound C comprising at least one tertiary aliphatic carboxyl group and two aliphatic hydroxyl groups, and
   d) optionally one carboxylic acid compound D comprising one carboxyl group, the molar ratio of compounds A:B:C:D being (X+Y−1):X:Y:Z.

wherein X ranges from 2 to 8, Y ranges from 2 to 8, and Z ranges from 0 to 2.

6. The polyglycidylester resin of claim 5 in which compound A is a cycloaliphatic dicarboxylic acid comprising two secondary aliphatic carboxyl groups or the anhydride thereof.

7. The polyglycidylester resin of claim 6 in which compound A is hexahydrophthalic acid or the anhydride thereof.

8. The polyglycidylester resin of claim 5 in which compound B comprises two secondary aliphatic hydroxyl groups.

9. The polyglycidylester resin of claim 8 in which compound B comprises one or more cyclohexane rings, the compound being substituted by two secondary hydroxyl groups.

10. The polyglycidylester resin of claim 9 in which compound B is hydrogenated diphenylol propane.

11. The polyglycidylester of claim 5 in which compound C comprises a tertiary aliphatic carboxyl group and two primary hydroxyl groups.

12. The polyglycidylester resin of claim 11 in which compound C is dimethylolpropionic acid.

13. The polyglycidylester resin of claim 5 in which compound D is cyclohexane carboxylic acid.

14. The polyglycidylester resin of claim 5 in which X ranges from 5 to 7.

15. The polyglycidylester resin of claim 5 in which Y ranges from 3 to 5.

16. The polyglycidylester resin of claim 5 in which Z ranges from 1–2.

17. A powder coating composition comprising a polyglycidylester resin of claim 5 and a cross-linking agent.

18. A product coated with the powder coating composition of claim 17.

19. A cured product of claim 17.

* * * * *